United States Patent

Marcinkus

[15] 3,659,859

[45] May 2, 1972

[54] CASSETTE CHANGER WITH A PAUSE MODE

[72] Inventor: Donald W. Marcinkus, Arlington Heights, Ill.

[73] Assignee: Ampex Corporation, Redwood City, Calif.

[22] Filed: Nov. 10, 1969

[21] Appl. No.: 875,259

[52] U.S. Cl. ..........................274/4 F, 179/100.2 Z, 226/50, 274/4 D

[51] Int. Cl. ..........................G11b 15/29

[58] Field of Search ..........................274/4 C, 4 E, 4 F, 4 G, 11 C; 242/197–200; 179/100.2 Z, 100.2 R; 353/15; 226/50

[56] References Cited

UNITED STATES PATENTS

| | | | |
|---|---|---|---|
| 3,050,225 | 8/1962 | Ulman | 179/100.2 R UX |
| 3,127,178 | 3/1964 | Osborne | 274/4 F UX |
| 3,359,665 | 12/1967 | Gerry | 274/4 F UX |
| 3,385,534 | 5/1968 | Staar | 242/200 X |
| 3,495,835 | 2/1970 | Laa | 179/100.2 Z X |

FOREIGN PATENTS OR APPLICATIONS

| | | | |
|---|---|---|---|
| 1,578,053 | 7/1969 | France | 274/4 E |

*Primary Examiner*—Leonard Forman
*Assistant Examiner*—Dennis A. Dearing
*Attorney*—Fitch, Even, Tabin, Luedeka and Robert G. Clay

[57] ABSTRACT

By operating a pause selector for a cassette changer apparatus, the user may interrupt a playback from or recording onto a tape of a cassette and, after the interruption, resume playback or recording by return of the pause selector. The mechanism for achieving a pause includes a carrier for carrying a sound transducer head and tape drive components to and from an operative position with the tape and a pause position in which the sound transducer head and tape drive components are spaced from the tape. The carrier will be in the pause position unless a playback or recording operation is in process.

5 Claims, 7 Drawing Figures

INVENTOR
Donald W. Marcinkus

Anderson, Luedeka, Fitch, Even & Tabin ATTYS.

Patented May 2, 1972

3,659,859

4 Sheets-Sheet 2

INVENTOR
Donald W. Marcinkus

Anderson, Luedeka, Fitch, Even & Tabin ATTYS.

Patented May 2, 1972 3,659,859

4 Sheets-Sheet 3

INVENTOR
Donald W. Marcinkus

Anderson, Luedeka, Fitch, Even & Tabin ATTYS.

INVENTOR
Donald W. Marcinkus

Anderson, Luedeka, Fitch, Even & Tabin ATTYS.

CASSETTE CHANGER WITH A PAUSE MODE

This invention relates to a cassette changer apparatus of the kind which automatically transfers cassettes stored in a magazine to an operative position within the changer for playback from or for recording onto a tape stored in the cassette and, more particularly, to an apparatus for providing under selective control the positional and functional relationships between the tape cassette and its sound and drive system.

The present invention is directed to a cassette changer in which cassettes are transferred from the magazine to a movable chassis of the kind shown in U.S. Pat. No. 3,385,534 in which a pair of tape spindles are inserted into the tape reels and tape capstans are inserted into the cassette as the movable chassis delivers the cassette into an operative playing or recording position with a stationary transducer head and a pinch roller for pressing the tape against the capstan. In such cassette changers it is most desirable to provide the ability to "pause," i.e., interrupt momentarily the playback or recording operation during a playback or recording operation. The ability to pause is often most desirable, e.g., when recording on the tape, as the person doing the recording often wishes to stop and think momentarily and then reinstitute recording. Likewise, when the tape is being played back, occasions arise when it is desired to interrupt play momentarily and then resume playing at the point of interruption.

In accordance with a feature of the present invention, the "-pause" or "standby" mode is made the normal position for the cassette changer with the result that it is possible to initiate immediately "fast tape" winding operations with operation of a fast wind selector without shifting from a slow speed operation as with known cassette changers of this kind.

In order to achieve a commercially feasible "pause" mode for cassette changers having such a movable chassis, it is necessary that the mechanisms be kept simple and capable of being manufactured at a low cost while attaining accurate location and cooperation between the cassette, the sound system components and the tape and reel drives. Also, the pause mechanism should be reliable and foolproof in operation.

Accordingly, an object of the invention is to provide an improved "pause" or "standby" mechanism, as contrasted to the prior art, for a cassette changer of the foregoing kind.

Other objects and advantages of the invention will become apparent when taken in connection with the accompanying drawings in which.

Figure 1:
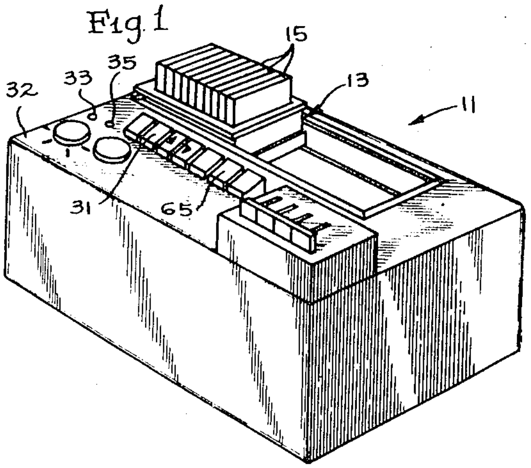
FIG. 1 is a perspective view of a cassette changer embodying the novel features of the invention.

As shown in the drawings for purposes of illustration, the invention is embodied in a cassette changer 11 having a magazine 13 in which are stored a series of tape cartridges 15 of the cassette type each having a pair of reels 16 and 17 (FIG. 4) between which extends and on which is wound a tape 18. The cassettes are transferred from the storage magazine to an operative position for playing or recording by means including a movable chassis 20 (FIG. 3) which has a pair of cassette supports in the form of tubes 22 which lower the cassette downwardly while operatively connecting tape feeding means carried thereby with the tape 18. The tape feeding means comprises a pair of capstans 23 which penetrate into the cassette and a pair of spindles 24 which penetrate into the respective tape reels 16 and 17.

Figures 3, 4:
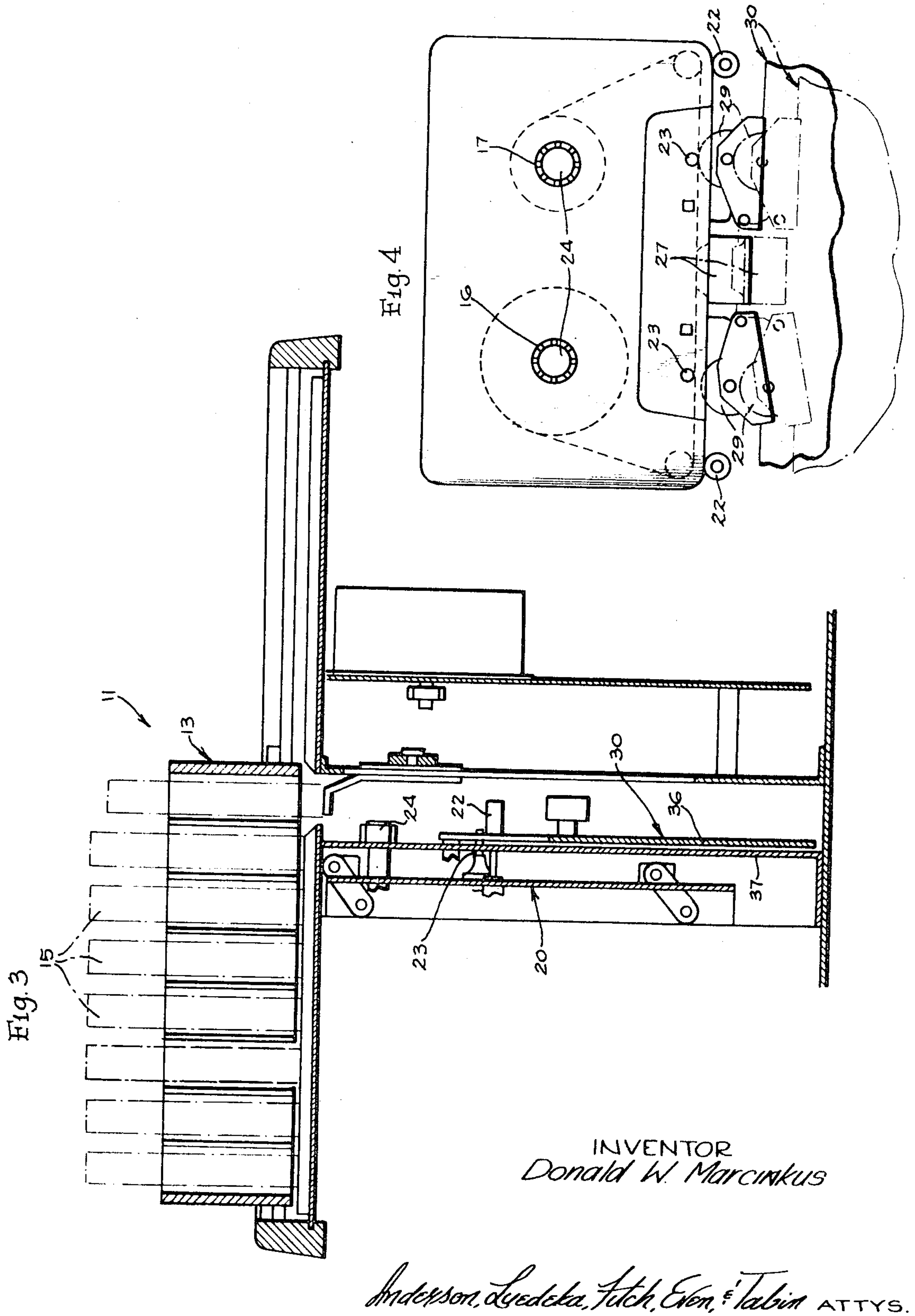
FIG. 3 is an enlarged, partial, longitudinal sectional view of the cassette changer of FIG. 1.
FIG. 4 illustrates a cassette and a pause mechanism in operative and standby positions.

In accordance with the present invention, the normal position of the cassette changer 11 is a standby or pause condition, illustrated in phantom lines in FIG. 4, in which the tape 18 is spaced from a sound transducer head 27 and the tape remains stationary because pinch rollers 29 are also spaced from the tape even though the tape capstans 23 and spindles 24 are inserted into operative driving relationships within the cassette. To feed the tape and to bring the transducer head 27 from the pause position into an operative position, illustrated in solid lines in FIG. 4, in which the transducer head engages the tape and one of the pinch rollers presses the tape against an associated one of the tape feeding capstans 23, the transducer head and pinch rollers are mounted on and carried by a pause carrier 30 which is shiftable toward the cassette from the pause position. During playing or recording, the pause carrier 30 and the transducer head and pinch rollers thereon may be shifted away from the cassette by depressing a pause push button selector 31, as best seen in FIG. 1, and carried on an upper panel 32 of the cassette changer 11. Also as will be explained, when the cassette changer is in the pause mode either a forward directional light 33 or a reverse directional light 35 on the panel is lit to signify the direction in which the tape will feed when tape feeding is resumed.

Figure 5:
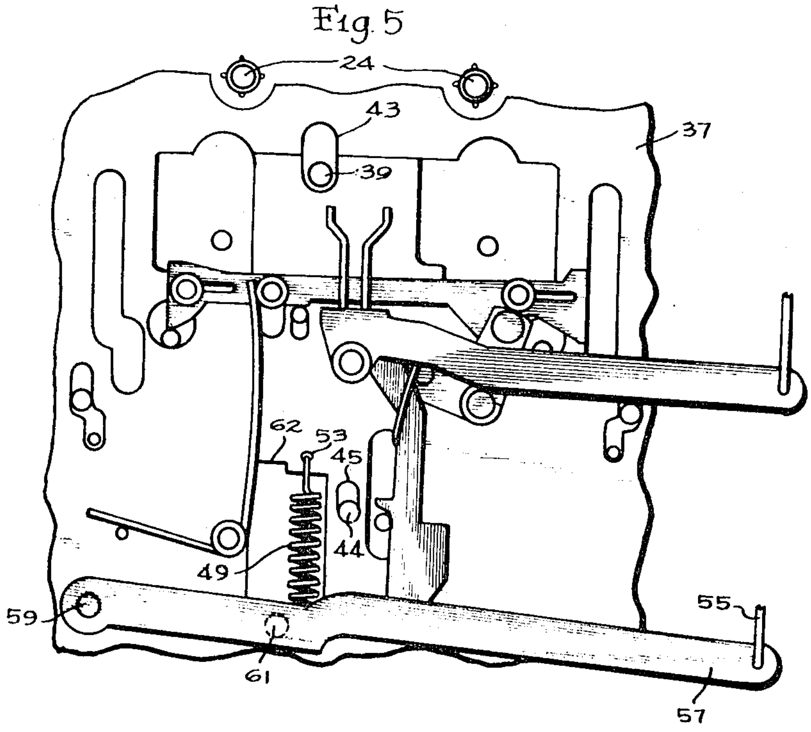
FIGS. 5 and 6 illustrate a pause lever and a control for causing reversal of the tape transport.

Referring now in greater detail to the elements of the invention, the means for moving the transducer head 27 and pinch rollers 29 from the pause position into the operative tape engaging position includes the shiftable pause carrier 30 which is mounted for sliding movement in a vertical direction along a stationary vertical wall 37. In this instance, the pause carrier 30 is in the form of a vertically disposed plate 36 which has a central flat portion disposed adjacent and parallel to the stationary, vertical plate or wall 37 of the cassette changer, as best seen in FIG. 3. The pause plate 36 is guided for translation and is accurately located relatively to the cassette by means of an upper guide roller 39 (FIGS. 2, 5 and 6) projecting from an upper finger 41 on the pause plate 36 for sliding within a vertically elongated aperture 43 in the stationary wall 37. As best seen in FIG. 5, a lower guide roller 44 is also fastened to the pause plate 36 and is inserted into and constrained for sliding in a lower elongated slot 45 in the stationary wall 37. Along the vertical sides of the pause plate 36 are formed inturned flanges 47 (FIG. 2) which extend adjacent and parallel to similarly inturned, vertical flanges 48 on the sides of the stationary wall 37. Thus, the carrier 30 is guided along a straight line vertical path and is limited in upward or downward movements by the guide rollers 39 and 44 abutting ends of the elongated slots.

Figure 2:
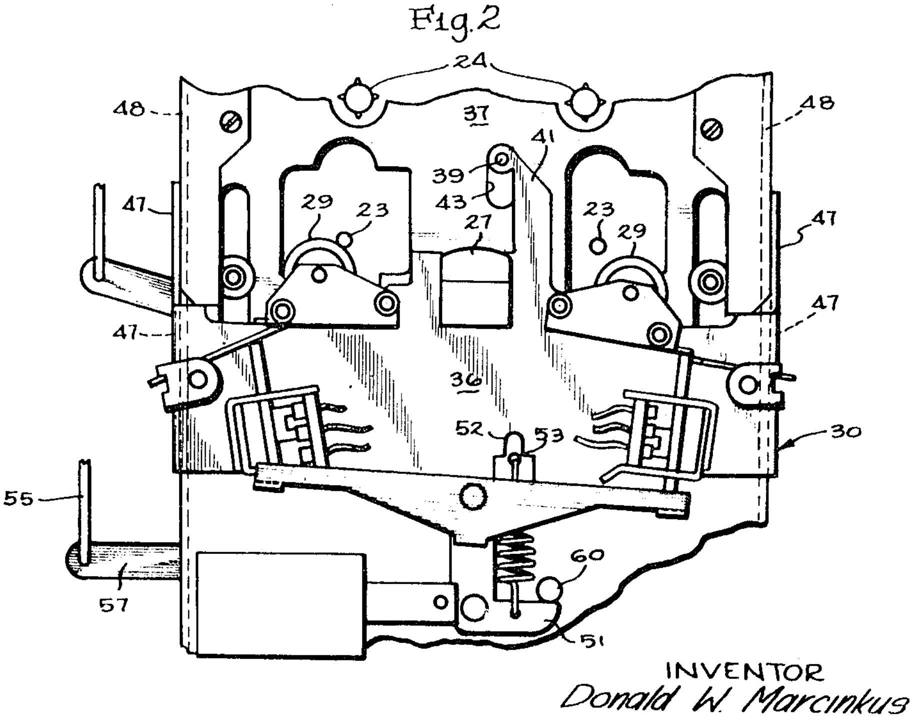
FIG. 2 is an enlarged, fragmentary, partial view showing a pause carrier for the cassette changer of FIG. 1.

The pause carrier 30 is preferably biased into the operative play/record position by means of a contractile return spring 49 which is fastened at its lower end in a spring retainer opening in a laterally extending foot 51, as best seen in FIG. 2, on the lower end of the carrier plate 36. The return spring 49 is positioned within an opening 52 in the pause plate 36 and has its upper end hooked in a hole 53 in the stationary wall 37. As will be explained, the return spring contracts and lifts the pause carrier 30 into the operative position from the pause position.

Figure 6:
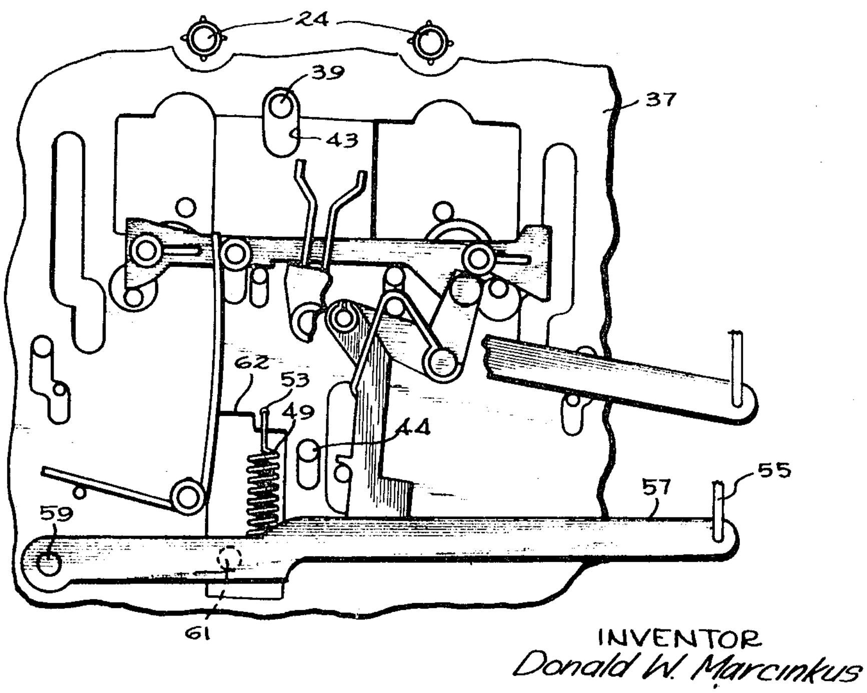
Figure 7:
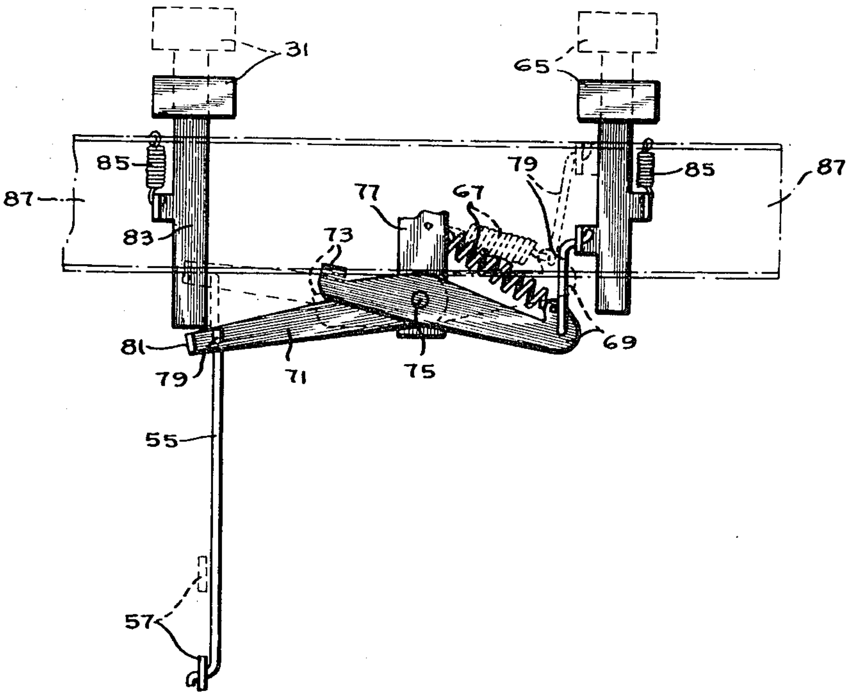
FIG. 7 illustrates selectors for controlling the pause operation.

To shift the pause carrier 30 into the pause position from the operative position, the selector 31 on the upper panel of the cassette changer is in the form of a push button which may be depressed from the upper dotted line position shown in FIG. 7 to the solid line position to force downwardly a vertically disposed wire link 55 which is connected at its lower end to a laterally extending pause lever 57 which, in turn, forces the pause carrier 30 downwardly against the urging of the return spring 49. As best seen in FIGS. 5 and 6, the pause lever 57 is pivotally mounted at its opposite end from the link 55 on a horizontally disposed pivot stud 59 fixed to the stationary wall 37. The pause lever 57 is disposed in a vertical plane behind and parallel to the plane of the stationary wall 37 and is provided with an actuating pin or stud 61 projecting laterally through the opening 62 in the stationary wall 37 into overlying and abutting relationship with the upper edge of the foot 51 of the carrier plate 36. The actuating pin 61 engages the foot 51 at a position closely adjacent to the point at which the return spring 49 exerts its return force and this point is generally centrally of the carrier and its guiding flanges 47. This facilitates straight line, non-binding translatory movement of the carrier 30 toward the pause position with downward pivotal movement of the pause lever 57 between the positions shown in FIGS. 5 and 6, respectively.

The selective positioning of the pause carrier 30 between the pause position and the operative position is controlled by means which is operated by the pause push button selector 31 or a play/record selector 65. The play/record selector 65 is also in the form of a push button similar to the pause push button, but additionally operates suitable circuits for causing the tape feeding and sound systems to commence or terminate operation. It will be recalled that the normal position of the pause carrier 30 is in the downward pause position at which position the return spring 49 is stretched. The pause carrier 30 is normally held in the pause position by means of a strong, overriding control spring 67 (FIG. 7) which acts through a play lever 69 and a position control lever 71 to force the link 55 down thereby pivoting the pause control lever 57 down to the position at which the pause control lever holds the pause carrier in the standby mode.

The play lever 69 is operated by the play/record selector 65 moving between its depressed and upper positions. More specifically, the play lever 69 is pivotally mounted intermediate its ends on a horizontal post 75 on a stationary bracket 77 with a first end disposed adjacent the play/record selector and connected thereto by a stiff wire link 79. The link 79 has a lower end formed with an offset hook inserted into the play lever and an upper offset hook inserted into an aperture in the push button selector 65 so that the play lever is turned about the pivot post 75 with vertical movement of the play/record selector 65. When the play/record selector 65 is in its non-operated upper position, shown in dotted lines in FIG. 7, the play lever 69 is held by the overriding spring 67 in the illustrated dotted line position in which a laterally extending tab 73 therein abuts the top side of the control lever 71 and holds the same in its lowered position, as illustrated in solid lines in FIG. 7, with the link 55 holding the pause lever 57 down. More particularly, the control lever 71 is also pivotally mounted on the post 75 and has an aperture receiving an offset hook end 79 of the vertically disposed link 55. The control lever 71 is formed with a laterally extending offset 81 which is positioned beneath a lower end of a stem 83 of the pause push button selector 31 for engagement and downward movement thereby when the control lever is in the upper position shown in phantom lines in FIG. 7. More specifically, should the pause pushbutton selector be depressed and the control lever 71 be in the upper phantom line position, its stem 83 will abut the offset 81 and force the control lever 71 down and thereby cause the link 55 and pause lever 57 to also go down and place the pause carrier 30 in the pause position. As stated above, when the cassette changer is at rest with both the push button selectors 31 and 65 in their upper non-operated positions, the play lever 69 will be urged by its strong overriding spring 67 to abut its tab 73 on the control lever 71 and force the latter downward thereby forcing the link 55 and pause lever 57 down with the result that the pause carrier 30 is also in the standby position.

Should it be desired to commence playing or recording, a depression of the play/record selector 65 acts through its attached link 79 to pivot the control lever 69 to lift its tab 73 from the control lever 71 whereby the pause carrier return spring 49 may lift the pause carrier 30 and act through the pause carrier lever 57 and link 55 to pivot the control lever 71 upwardly to the phantom line position illustrated in FIG. 7 in which the pause lever will also be in the upper dotted line position. The lifting of the pause lever and its actuating pin 61 which is engaging the foot 51 of the carrier allows the return spring 49 to lift the carrier and return the sound transducer head 27 into engagement with the tape and to return a pinch roller 29 to establish a tape feeding nip with one of the capstans 23.

As is more fully explained in copending application entitled "Cassette Lowering and Release Mechanism", Ser. No. 875,045 filed of even date which is hereby incorporated by reference as fully reproduced herein, both the pause selector 31 and the play/record selector 65 have a separate latch mechanism (not shown) which automatically latches the same in a depressed operative position in which the selector remains until released. The operated selector 31 or 65 is readily released by a further slight depression thereof whereby the selector is unlatched and may be returned upwardly by a spring 85 connected to a bracket 87 in which the push button selectors 31 and 65 are mounted and guided for vertical translational movement.

From the foregoing, it will be seen that the present invention provides a simple and efficient pause mode of operation whereby the pinch rollers and sound transducer are usually shifted from the tape and in a pause position so that the tape feeding mechanism is immediately available for fast winding or unwinding operations. Also, the provision of the pause selector enables the person playing the cassette changer to institute a pause momentarily or for a relatively prolonged period merely by operation of the selector.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a cassette changer apparatus for cassettes having a pair of tape reels between which a tape is wound or unwound, the combination comprising a laterally slidable magazine for storing the cassettes and for selectively releasing the cassettes for playing or recording, transporting means including an elevator for lowering one of the cassettes from said magazine into an operative position for playback or recording and for lifting and returning the same to said magazine, a laterally and downwardly shiftable chassis carrying a pair of tape spindles for simultaneously penetrating the tape reels during downward movement of said cassette and forward and reverse drive tape capstans for insertion into said cassette and behind said tape to transport the tape, a sound transducer head for operative association with said tape in said cassette when said cassette is in said operative playing position, a forward tape pressing means movable between a position spaced from said tape and a pressing position for holding said tape against said forward drive capstan, a reverse tape pressing means movable between a position spaced from said tape and a pressing position for pressing said tape against said reverse tape drive capstan, a vertically movable carrier means for carrying said sound transducer head and said forward and reverse tape pressing means downwardly from said tape to a pause position and for returning the same upwardly to engage said sound transducer head with said tape and to engage one of said tape pressing means with said tape, and selectively operable pause means for providing a pause in a playback or recording operation by shifting said carrier means downwardly from a cassette at said operative position and for shifting said carrier means upwardly with the previously positioned tape pressing means in its tape pressing position to resume the same tape transport direction after a pause.

2. A cassette changer apparatus in accordance with claim 1 in which said selectively operable means includes a manually operable pause selector which is operable between an inoperative, first position during which playback or recording may take place and a second, operative position to cause said carrier means to shift to said pause position thereby interrupting playback or recording.

3. A cassette changer in accordance with claim 1 in which a biasing means urges said carrier means to shift said transducer head and said tape pressing means into engagement with said tape and in which said selectively operable means includes means for holding said carrier means in said pause position against the urging of said biasing means.

4. A cassette changer apparatus in accordance with claim 3 in which said carrier means comprises a plate and means for constraining said plate to translational movement from a lower pause position to an upper operative position.

5. A cassette changer in accordance with claim 2 in which said manually operable selector is a push button movable from an upper inoperative position to a depressed operative position and in which a link and lever are operatively associated with said push button to be operated with depression of said push button to shift said carrier to said pause position.

* * * * *